(12) United States Patent
Lu

(10) Patent No.: US 11,437,869 B2
(45) Date of Patent: Sep. 6, 2022

(54) PERIPHERAL DEVICE

(71) Applicants: DEXIN ELECTRONIC LTD., Guangdong (CN); DEXIN CORPORATION, New Taipei (TW)

(72) Inventor: Ho-Lung Lu, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/015,081

(22) Filed: Sep. 9, 2020

(65) Prior Publication Data
US 2021/0210993 A1 Jul. 8, 2021

(30) Foreign Application Priority Data
Jan. 3, 2020 (TW) .................................. 109200071

(51) Int. Cl.
*H02J 50/80* (2016.01)
*G06F 3/039* (2013.01)
*G06F 3/0354* (2013.01)

(52) U.S. Cl.
CPC .............. *H02J 50/80* (2016.02); *G06F 3/039* (2013.01); *G06F 3/0395* (2013.01); *G06F 3/03543* (2013.01); *H02J 2207/30* (2020.01)

(58) Field of Classification Search
None
See application file for complete search history.

(56) References Cited

U.S. PATENT DOCUMENTS

| | | | | |
|---|---|---|---|---|
| 2007/0132733 A1* | 6/2007 | Ram | .................... | G06F 3/03544 345/163 |
| 2011/0175567 A1* | 7/2011 | Kidakarn | ................ | H02J 50/40 320/108 |
| 2016/0181850 A1* | 6/2016 | Toivola | .................... | H02J 50/00 320/108 |
| 2017/0357337 A1* | 12/2017 | Chou | .................... | H02J 7/0042 |
| 2019/0129558 A1* | 5/2019 | Yildiz | ................ | G06F 3/04883 |
| 2019/0305576 A1* | 10/2019 | Chou | ...................... | H02J 7/025 |

FOREIGN PATENT DOCUMENTS

CN 107783676 A * 3/2018 ......... G06F 3/03543

* cited by examiner

*Primary Examiner* — Xuyang Xia
(74) *Attorney, Agent, or Firm* — Li & Cai Intellectual Property Office

(57) ABSTRACT

A peripheral device includes a flat body, a control module, a wireless charging module, a first connector module, a second connector module, and a signal transmission module. The wireless charging module is electrically connected to the control module. The wireless charging module is disposed in the flat body. The first connecter module is disposed in the flat body. The second connector module is disposed in the flat body. The signal transmission module is electrically connected to the control module, the first connector module, the second connector module, and the wireless charging module. The signal transmission module is disposed in the flat body. A turn-on state or a turn-off state of the wireless charging module is determined based on whether the first connector module is electrically connected to wireless signal receiver or not.

5 Claims, 3 Drawing Sheets

PERIPHERAL DEVICE

CROSS-REFERENCE TO RELATED PATENT APPLICATION

This application claims the benefit of priority to Taiwan Patent Application No. 109200071, filed on Jan. 3, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a peripheral device, and more particularly to a peripheral device having a wireless charging function.

BACKGROUND OF THE DISCLOSURE

Generally, a simple operating surface is provided by a mouse pad for a mouse. However, many mouse devices have a wireless charging function. When the mouse device is in a lower battery state, the user needs to charge the mouse by putting the mouse device on a wireless charging device, thereby causing inconveniences for the user.

Therefore, it is an important issue in the industry to provide a peripheral device having a wireless charging function.

SUMMARY OF THE DISCLOSURE

In response to the above-referenced technical inadequacies, the present disclosure provides a peripheral device.

In one aspect, the present disclosure provides a peripheral device. The peripheral device include a flat body, a control module, a wireless charging module, a first connector module, a second connector module, and a signal transmission module. The wireless charging module is electrically connected to the control module. The wireless charging module is disposed in the flat body. The first connecter module is disposed in the flat body. The second connector module is disposed in the flat body. The signal transmission module is electrically connected to the control module, the first connector module, the second connector module, and the wireless charging module. The signal transmission module is disposed in the flat body. A turn-on state or a turn-off state of the wireless charging module is determined based on whether or not the first connector module is electrically connected to wireless signal receiver.

In another aspect, the present disclosure provides a peripheral device. The peripheral device includes a flat body, a control module, a wireless charging module, a first connector module, and a signal transmission module. The wireless charging module is electrically connected to the control module. The wireless charging module is disposed in the flat body and configured to provide a wireless power to a mouse device. The first connector module is disposed at a side of the flat body. The signal transmission module is electrically connected to the control module, the first connector module, and the wireless charging module. The signal transmission module is disposed in the flat body. A turn-on state or a turn-off state of the wireless charging module is determined based on whether the first connector module is connected to a wireless signal receiver or not.

Therefore, the peripheral device of the present disclosure combines a mouse pad and a wireless charging module, such that the peripheral device can be conveniently carried by a user. Furthermore, a turn-on state or a turn-off state of the wireless charging module is controlled based on whether the wireless signal receiver is connected or not. The peripheral device effectively combines a communication between the mouse device and the wireless signal receiver, such that functions of the mouse pad are more diversified.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
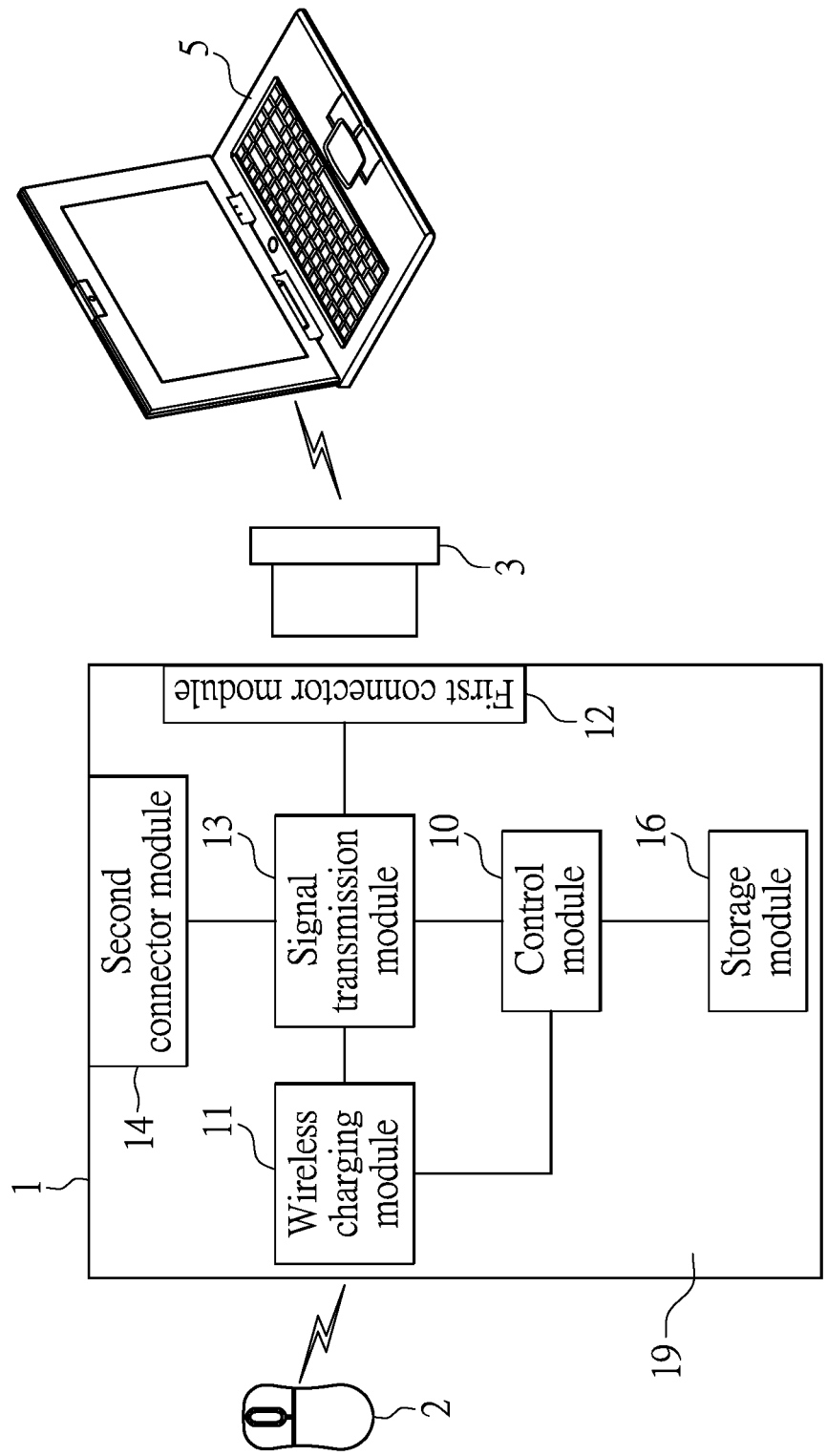
FIG. 1 is a block diagram showing a peripheral device according to a first embodiment of the present disclosure working in cooperation with a mouse device, a wireless signal receiver, and a computer.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
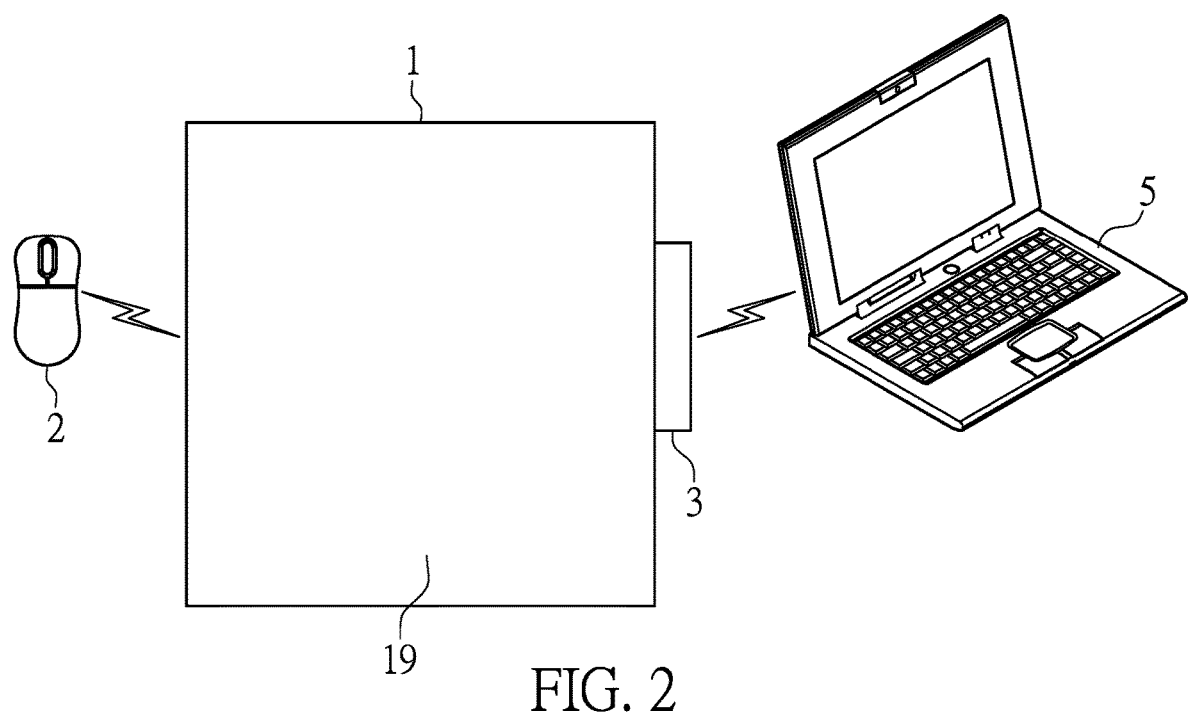
FIG. 2 is a schematic view showing the peripheral device according to the first embodiment of the present disclosure working in cooperation with a mouse device and a wireless signal receiver.

Referring to FIG. 1 and FIG. 2, FIG. 1 is a block diagram showing a peripheral device according to a first embodiment of the present disclosure working in cooperation with a mouse device, a wireless signal receiver, and a computer. FIG. 2 is a schematic view showing the peripheral device according to the first embodiment of the present disclosure working in cooperation with a mouse device and a wireless signal receiver.

In the embodiment, the peripheral device 1 cooperates with a mouse device 2, a wireless signal receiver 3, and a computer 5 for operation. The peripheral device 1 is a mouse pad. The wireless signal receiver 3 is disposed in the peripheral device 1. The mouse device 2 is in communication with the wireless signal receiver 3 and the computer 5. A user can use the mouse device 2 to execute various programs for the computer 5. In the embodiment, the wireless signal receiver 3 is a Wi-Fi receiver or a Bluetooth® receiver. The wireless signal receiver 3 converts received wireless signals into signals having a USB protocol, and transmits the converted signals. Furthermore, the wireless signal receiver 3 is paired with the mouse device 2. The mouse device 2 is a wireless mouse device.

The peripheral device 1 includes a control module 10, a wireless charging module 11, a first connector module 12, a signal transmission module 13, a second connector module 14, and a flat body 19.

The wireless charging module 11 is electrically connected to the control module 10. The wireless charging module 11 is disposed in the flat body 19. The wireless charging module 11 includes a wireless charging antenna unit (not shown) and a power adjusting unit (not shown). The wireless charging antenna unit (not shown) and the power adjusting unit (not shown) are disposed in the flat body 19. The peripheral device 1 is a hard mouse pad or a flexible mouse pad. A material of the flat body 19 of the peripheral device 1 is plastic, cloth fabric, metal, rubber, or leather.

In the embodiment, the peripheral device 1 includes the first connector module 12 and the second connector module 14. In other embodiments, the peripheral device 1 can include only the first connector module 12.

The first connector module 12 is electrically connected to the control module 10 through the signal transmission module 13. In other words, the first connector module 12 is electrically connected to the signal transmission module 13, and the signal transmission module 13 is electrically connected to the control module 10. The second connector module 14 is electrically connected to the signal transmission module 13, and the signal transmission module 13 is electrically connected to the control module 10. The first connector module 12 is disposed in the flat body 19. The second connector module 14 is also disposed in the flat body 19. The first connector module 12 and the second connector module 14 can be disposed at the same side or the different sides of the flat body 19.

The first connector module 12 is a type-A universal serial bus (USB) connector. The second connector module 14 is electrically connected to a power source (not shown). The power received by the second connector module 14 is provided to the wireless charging module 11 to transmit a wireless power. The second connector module 14 is a type-C USB connector or a micro-USB connector.

In other words, the signal transmission module 13 is electrically connected to the control module 10, the first connector module 12, and the wireless charging module 11. The signal transmission module 13 is disposed in the flat body 19.

The signal transmission module 13 is an inter-integrated circuit (I2C), a Serial Peripheral Interface Bus Circuit (SPI), or a USB circuit. In other words, when the signal transmission module 13 is the I2C or the SPI, the signals having a USB protocol transmitted by the wireless signal receiver 3 are converted by the control module 10 and the signal transmission module 13 into the I2C signals or the SPI signals, and provided to the wireless charging module 11. When the signal transmission module 13 is a USB signal transmission circuit, the control module 10 can directly provide the signals having the USB protocol transmitted by the wireless signal receiver 3 to the wireless charging module 11.

In the embodiment, when the wireless signal receiver 3 is disposed in the first connector module 12, the wireless charging module 11 is notified to provide a power to the electronic device, such as the mouse device 2 of the present disclosure. When the wireless signal receiver 3 is not disposed in the first connector module 12, the wireless charging module 11 cannot provide the power to the electronic device. In other words, the wireless charging module 11 cannot provide the power to the mouse device 2. In other words, a turn-on state or a turn-off state of the wireless signal module 11 is determined based on whether the first connector module 12 is connected to the wireless signal receiver 3 or not. When the wireless charging module 11 cannot provide the power, the peripheral device 1 is only used as a mouse pad.

Furthermore, the peripheral device 1 further includes a storage module 16. The storage module 16 is electrically connected to the control module 10. When the mouse device 2 is in communication with the wireless signal receiver 3, and the wireless signal receiver 3 is electrically connected to the first connector module 12, the mouse device 2 transmits a mouse device configuration value to the storage module 16 of the peripheral device 1 to be stored therein. In other words, the peripheral device 1 can store a configuration data of the mouse device 2.

Second Embodiment

Figure 3:
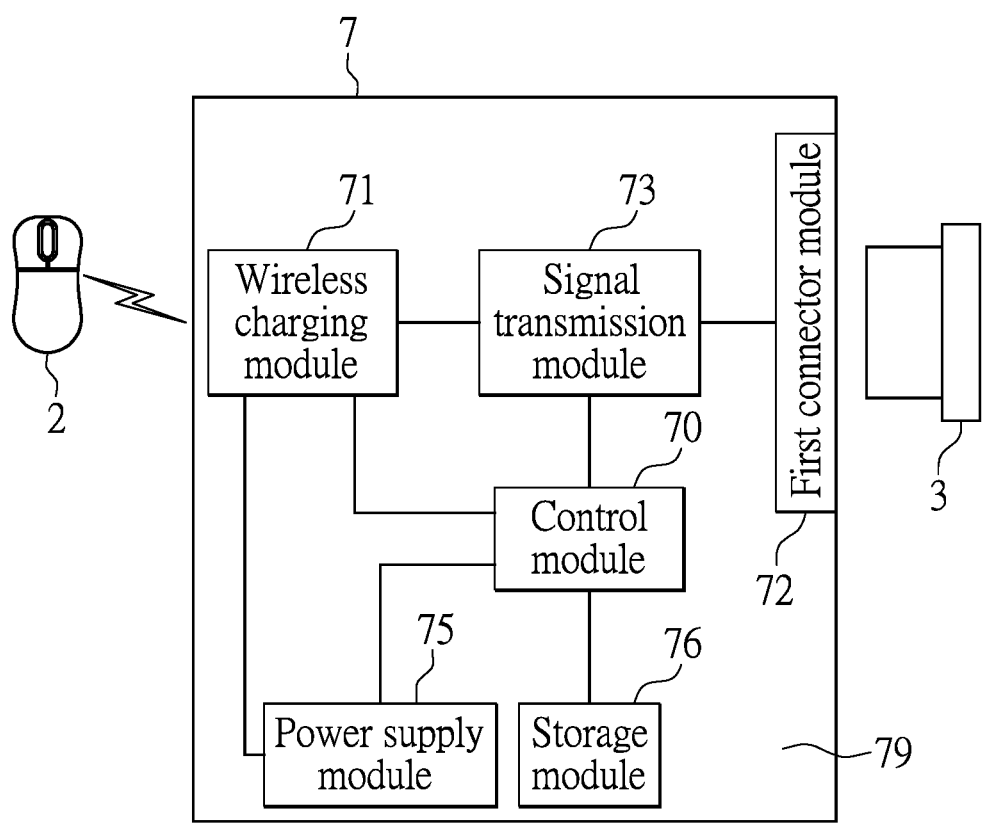
FIG. 3 is a block diagram showing a peripheral device according to a second embodiment of the present disclosure working in cooperation with a mouse device and a wireless signal receiver.

Referring to FIG. 3, FIG. 3 is a block diagram showing a peripheral device according to a second embodiment of the present disclosure working in cooperation with a mouse device and a wireless signal receiver.

In the embodiment, a peripheral device 7 is similar to the peripheral device 1 of the first embodiment. The peripheral device 7 does not include the second connector module, but includes a power supply module 75.

The peripheral device 7 includes a control module 70, a wireless charging module 71, a first connector module 72, a signal transmission module 73, a power supply module 75, and a flat body 79.

The power supply module 71 is electrically connected to the control module 70. The wireless charging module 71 is disposed in the flat body 79. The wireless charging module 71 includes a wireless charging antenna (not shown) and a power adjusting unit (not shown), and the wireless charging antenna (not shown) and the power adjusting unit (not shown) are disposed in the flat body 79. The peripheral device 7 is a hard mouse pad or a flexible mouse pad. The material of the flat body 79 of the peripheral device 7 is plastic, cloth fabric, metal, rubber, or leather.

The first connector module 72 is electrically connected to the control module 70 through the signal transmission module 73. In other words, the first connector module 72 is electrically connected to the signal transmission module 73, and the signal transmission module 73 is electrically connected to the control module 70. The first connector module 72 is disposed at a side of the flat body 79. The first connector module 72 is a type-A USB connector.

The signal transmission module 73 is electrically connected to the control module 70, the first connector module 72, and the wireless charging module 71. The signal transmission module 73 is disposed in the flat body 79.

The signal transmission module 73 is an inter-integrated circuit (I2C), a serial peripheral interface bus circuit (SPI), or a universal serial bus circuit (USB). In other words, when the signal transmission module 73 is the Inter-Integrated Circuit or the Serial Peripheral Interface Bus circuit, the signals having the USB protocol transmitted by the wireless signal receiver 3 are converted by the control module 70 and the signal transmission module 73 into the I2C signals or the SPI signals, and the converted signals are provided to the wireless charging module 71. When the signal transmission module 73 is a USB signal transmission circuit, the control module 10 can directly provide the signals having the USB protocol transmitted by the wireless signal receiver 3 to the wireless charging module 71. In the embodiment, the wireless signal receiver 3 is a Wi-Fi wireless receiver or a Bluetooth receiver. The wireless signal receiver 3 can convert received signals into signals having a USB protocol for transmission. Furthermore, the wireless signal receiver 3 of the embodiment is paired with the mouse device 2.

In the embodiment, when the wireless signal receiver 3 is disposed in the first connector module 72, the wireless charging module 71 is notified to provide a power to the electronic device, such as the mouse device 2 of the present disclosure. When the wireless signal receiver 3 is not disposed in the first connector module 72, the wireless charging module 71 cannot provide the power to the electronic device. In other words, a turn-on state or a turn-off state of the wireless charging module 71 is determined based on whether the first connector module 72 is connected to the wireless signal receiver 3 or not. When the wireless charging module 71 does not provide the electric power, the peripheral device 7 is only used as a mouse pad.

Furthermore, the peripheral device 7 further includes a storage module 76. The storage module 76 is electrically connected to the control module 70. When the mouse device 2 is in communication with the wireless signal receiver 3, and the wireless signal receiver 3 is electrically connected to the first connector module 72, the mouse device 2 transmits a mouse device configuration value to the storage module 76 of the peripheral device 7 to be stored therein. In other words, the peripheral device 7 can store a configuration data of the mouse device 2.

In the embodiment, the power supply module 75 is electrically connected to the control module 70 and the wireless charging module 71 to provide a driving power to the control module 70 and the wireless charging module 71. The power supply module 75 is a battery, a DC-to-DC voltage converting module, or an AC-to-DC voltage converting module.

In conclusion, the peripheral device of the present disclosure combines a mouse pad and a wireless charging module, such that the peripheral device can be conveniently carried by a user. Furthermore, a turn-on state or a turn-off state of the wireless charging module is controlled based on whether the wireless signal receiver is connected or not. The peripheral device effectively combines a communication between the mouse device and the wireless signal receiver, such that functions of the mouse pad are more diversified.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A peripheral device, comprising:
   a flat body;
   a control module;
   a wireless charging module being electrically connected to the control module, the wireless charging module being disposed in the flat body;
   a first connecter module being disposed in the flat body;
   a second connector module being disposed in the flat body; and
   a signal transmission module being electrically connected to the control module, the first connector module, the second connector module, and the wireless charging module, and the signal transmission module being disposed in the flat body;
   wherein a turn-on state or a turn-off state of the wireless charging module is determined based on whether or not the first connector module is electrically connected to a wireless signal receiver;
   wherein, when the signal transmission module is an inter-integrated circuit or a serial peripheral interface bus circuit, signals having a universal serial bus (USB) protocol transmitted by the wireless signal receiver are converted by the control module and the signal transmission module into inter-integrated circuit signals or serial peripheral interface bus circuit signals, and provided to the wireless charging module;
   wherein, when the signal transmission module is a universal serial bus signal transmission circuit, the control module directly provides the signals having the universal serial bus protocol transmitted by the wireless signal receiver to the wireless charging module;
   wherein, the wireless signal receiver is in communication with a mouse device, when the wireless signal receiver is electrically connected to the first connector module, the mouse device transmits a mouse device configuration value to a storage module of the peripheral device to be stored therein through the wireless signal receiver, and the storage module is electrically connected to the control module.

2. The peripheral device according to claim 1, wherein the first connector module is a type-A universal serial bus (USB) connector.

3. The peripheral device according to claim 1, wherein the second connector module is electrically connected to a power source, and the second connector module is a type-C USB connector or a micro-USB connector.

4. The peripheral device according to claim 1, wherein when the signal transmission module is a USB signal transmission circuit, the signal transmission module further includes a USB processor being electrically connected to the control module and the first connector module, and the USB processor is configured to convert signals transmitted or received by the first connector module into signals having the USB protocol.

5. The peripheral device according to claim 1, wherein the peripheral device is a mouse pad.

* * * * *